(12) United States Patent
Murphy

(10) Patent No.: US 8,468,739 B2
(45) Date of Patent: Jun. 25, 2013

(54) DROPPER-RIG FLY ASSEMBLY STORAGE BOX

(76) Inventor: Rex J. Murphy, Brisbane, CA (US)

( * ) Notice: Subject to any disclaimer, the term of this patent is extended or adjusted under 35 U.S.C. 154(b) by 132 days.

(21) Appl. No.: 12/800,947

(22) Filed: May 26, 2010

(65) Prior Publication Data

US 2011/0289819 A1    Dec. 1, 2011

(51) Int. Cl.
*A01K 97/06* (2006.01)
(52) U.S. Cl.
USPC .......................................................... 43/54.1
(58) Field of Classification Search
USPC ............................................ 43/54.1, 57.1, 41
See application file for complete search history.

(56) References Cited

U.S. PATENT DOCUMENTS

| | | | |
|---|---|---|---|
| 1,888,304 A * | 11/1932 | Baldwin | 43/57.1 |
| 2,065,234 A | 12/1936 | Martinez | |
| 2,267,640 A | 12/1941 | De Witt | |
| 2,596,214 A | 5/1952 | Corkran | |
| 2,814,152 A * | 11/1957 | Trujillo | 43/57.1 |
| 3,166,866 A * | 1/1965 | Norton et al. | 43/57.1 |
| 3,962,815 A * | 6/1976 | Christensen | 43/4 |
| 4,208,825 A * | 6/1980 | Barnes | 43/57.1 |
| 4,437,258 A | 3/1984 | Allard | |
| 4,813,173 A * | 3/1989 | Abbotoy | 43/57.1 |
| 4,999,943 A * | 3/1991 | Crabtree | 43/54.1 |
| 5,033,228 A * | 7/1991 | Gallivan | 43/54.1 |
| 5,319,877 A * | 6/1994 | Hagan | 43/54.1 |
| 5,555,671 A | 9/1996 | Voight et al. | |
| 6,134,825 A * | 10/2000 | Moffett et al. | 43/57.1 |
| 7,627,980 B2 * | 12/2009 | Rathsack | 43/57.2 |
| 2008/0244957 A1 * | 10/2008 | Rathsack | 43/57.1 |

* cited by examiner

*Primary Examiner* — Son T Nguyen
*Assistant Examiner* — Shadi Baniani
(74) *Attorney, Agent, or Firm* — Leonard Tachner

(57) ABSTRACT

A storage device that effectively organizes and protects dropper-rig, fly-fishing assemblies and the leaders that connect them. The device has an openable cap that creates a watertight interior through which a guide extends from the closed end of the device toward the cap. In operation, a user opens the cap of the device and slides an extension along the guide outward from the center of the outer case. With the extension fully exposed, a user attaches previously created dropper-rig assemblies. To attach an assembly, a user takes one of the two flies comprising a dropper-rig assembly and hooks it anywhere on a flexible sleeve that surrounds the extension. He then wraps the leader line, (the line that connects the two flies) around the sleeve until the second fly is in a position to be hooked to the sleeve. A user then returns the extension to within the outer case and seals the device by locking down the cap.

5 Claims, 6 Drawing Sheets

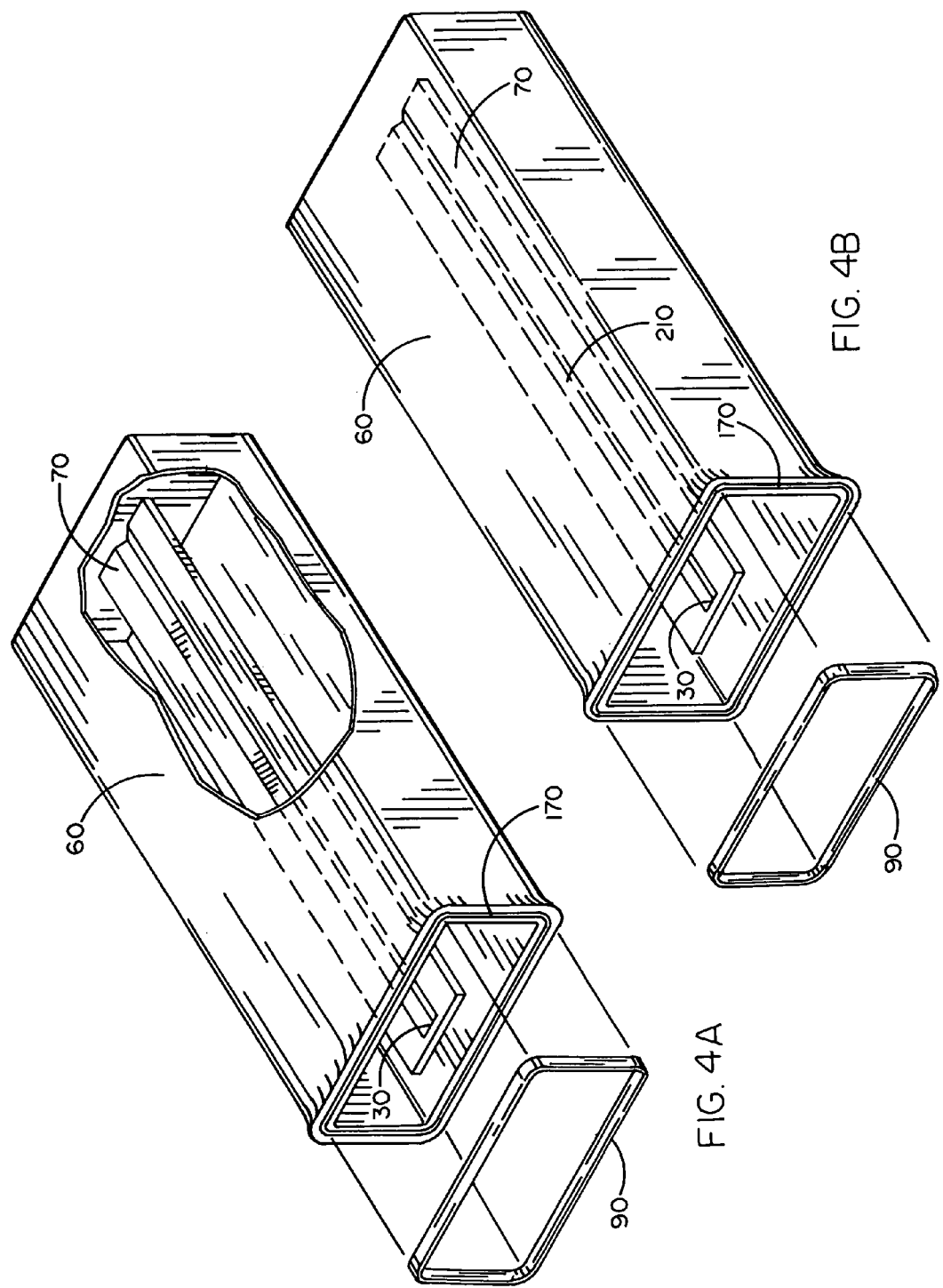

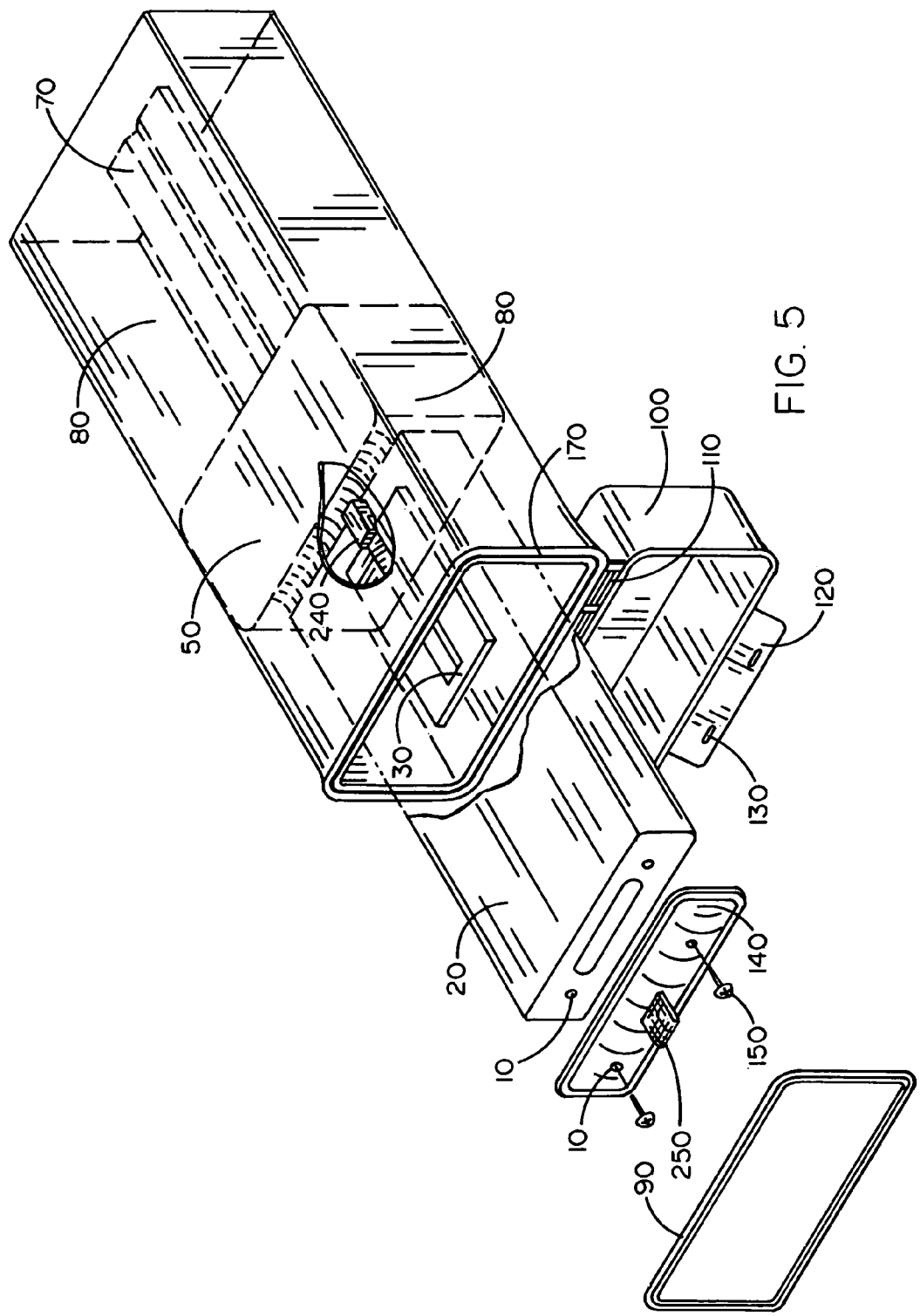

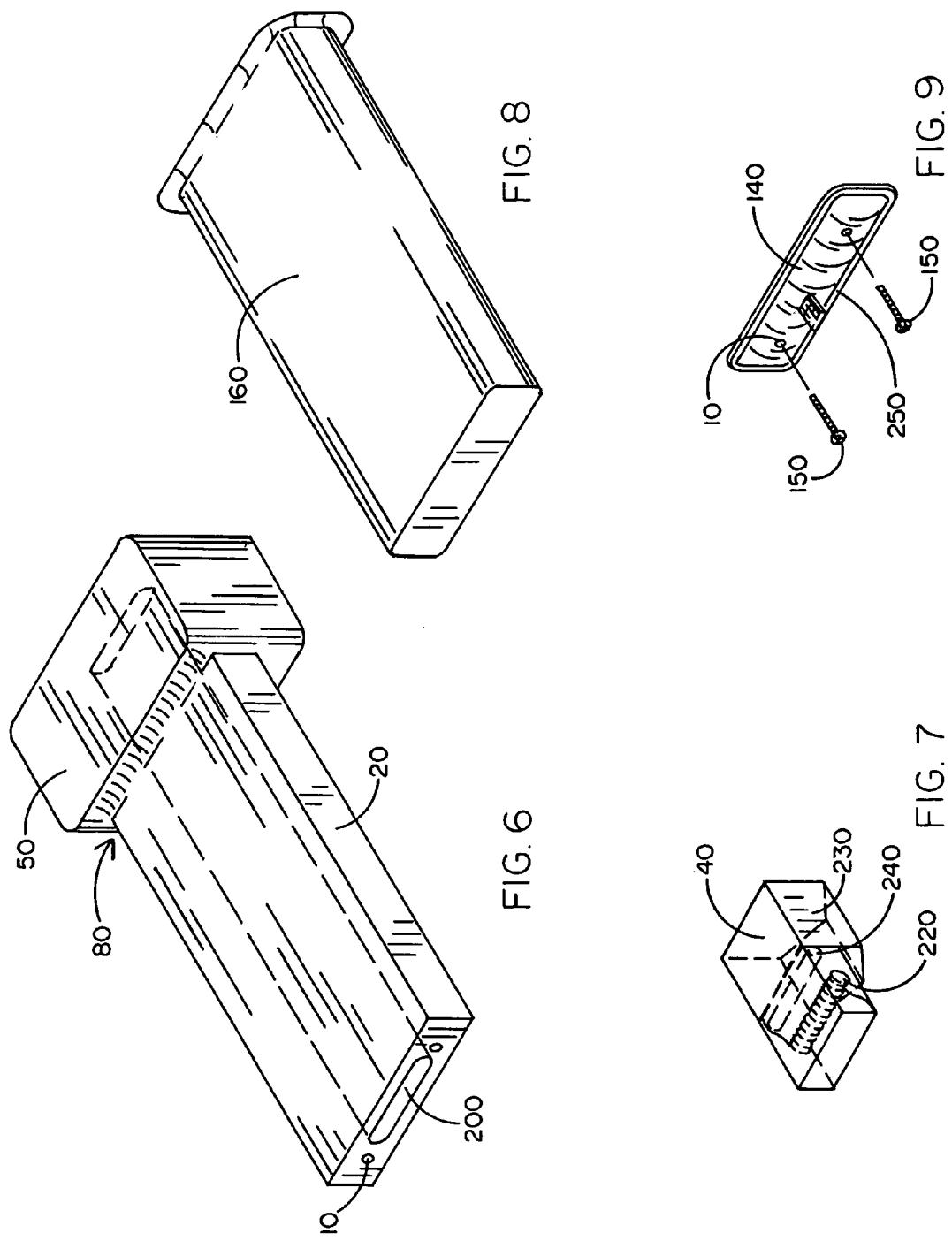

DROPPER-RIG FLY ASSEMBLY STORAGE BOX

BACKGROUND OF THE INVENTION

1. Field of the Invention

This invention relates generally to fly-fishing and, more particularly to a structure for storing artificial flies and monofilament fishing leaders.

2. Background Art

Fly-fishing is a distinct and ancient angling method, most renowned as a method for catching trout and salmon, but employed today for a wide variety of species including pike, bass, pan-fish, grayling and carp, as well as redfish, snook, tarpon, bonefish and striped bass.

In fly-fishing, fish are caught by using artificial flies. Artificial flies are created by tying hair, fur, feathers and other materials, both natural and synthetic, onto a hook with thread. The flies are made to have the sizes, colors and patterns to match local terrestrial and aquatic insects, baitfish, or other prey attractive to the target fish species.

Most, if not all fly-fishermen store artificial flies, often numbering in the hundreds, in what are commonly known as "fly boxes." A fly box is typically made from wood, plastic, foam or metal with a hinge and a locking mechanism that allows the box to be opened and closed repeatedly. Some fly boxes are also waterproof and some have rather intricate and varying methods for holding individual flies in place. There are even fly boxes that have the capacity to hold both a fly and an attached line in place. Typical examples of these fly boxes are shown in the following United States patents.

U.S. Pat. No. 2,065,234 to Martinez
U.S. Pat. No. 2,267,640 to De Witt
U.S. Pat. No. 2,596,214 to Corkran
U.S. Pat. No. 4,437,258 to Allard
U.S. Pat. No. 5,555,671 to Voight et al Although such fly boxes have achieved considerable popularity and commercial success, there has been a continuing need for improvement especially in the area of line and fly storage and the time management issues demanded by them.

Those who fly-fish regularly are inevitably exposed to what, in the fly-fishing vernacular is commonly referred to as a "dropper-rig." A "dropper-rig" is comprised of two flies tied together on a single piece of monofilament fishing line, with one fly at each end of the line. This combination of flies is then tied to the main line that comes from the rod and reel. The distance between the two flies may be anywhere from 3 inches to 10 feet.

Using dropper-rig flies is nothing new in the world of fly-fishing, dating back to the 1930's. Most experts agree that fly-fishing with a dropper-rig is one of the most effective methods for catching fish, but even with this increase in effectiveness, there remain inherent problems associated with using dropper-rigs. These are problems the currently available fly boxes on the market do not adequately address.

One of the most frustrating and time consuming issues associated with fishing dropper-rigs is the time and effort spent creating new dropper-rigs. Fisherman often experience what is known as a "snag." A snag results when one hooks the bottom and cannot free the line without breaking it, which is often. After the line breaks, one often has to create a new dropper-rig assembly. The process for creating a dropper-rig demands that a fisherman stop fishing and perform a number of technically demanding actions including, choosing flies, striping and cutting line, feeding very thin line through the small eye of a hook, tying three knots and so on. This process, depending on the weather, the lighting and what type of flies are working, can take up to 15 minutes to complete. If there's a snag in the line twice in one hour, one can spend half the time creating dropper-rigs as opposed to fishing them.

The present invention is a time saving device that allows a fisherman to store and easily access, pre-tied dropper-rigs. It keeps the dropper-rig assemblies well organized and ready for use thus reducing the amount of time required by a fisherman to manage the technical difficulties associated with creating new dropper-rigs while fishing. Furthermore, the present invention can be managed with one hand and has no loose parts or pieces, requires no lubrication and can be any size.

SUMMARY OF THE INVENTION

The present invention is a storage device that effectively organizes and protects dropper-rig, fly-fishing assemblies and the leaders that connect them. The device is a waterproof box made of plastic or wood or metal and comprises a cap, an O-ring assembly, a recessed center insert that extends and retracts from within an outer case, a guide with an arrest, a pressure clip with an arrest, a flexible extension sleeve with a lip and an extension cap with screws.

In operation, a user opens the cap of the device, reaches inside, takes hold of the extension tab and slides the extension outward from the center of the outer case. At this point, with the extension fully exposed, a user attaches previously created dropper-rig assemblies to the invention.

To attach an assembly, a user simply takes one of the two flies comprising a dropper-rig assembly and hooks it anywhere on a flexible sleeve that surrounds the extension. A user then wraps the leader line, (the line that connects the two flies) around the sleeve until the second fly is in a position to be hooked to the sleeve.

Once both flies and the monofilament that connects them are securely attached to the sleeve, a user then returns the exposed extension to its protected compartment within the outer case and seals the device by locking down the cap. During continued use, a user would both attach and remove previously created dropper-rig assemblies repeatedly.

This invention is designed to help a fly-fisherman to minimize the time spent dealing with the technical issues associated with fishing tackle, such as tying knots and stripping line and maximize the time spent fly-fishing.

The invention provides easy access to a wide variety of fly patterns as well as easy access to different combinations of fly patterns in dropper-rig design. It allows a fisherman to apply his or her fishing knowledge and change tackle as quickly as the environmental conditions change. This ease of use and access, when combined with the time saving features of the invention, makes it an almost indispensable piece of equipment for the serious fly-fisherman.

The present invention has certain advantages over currently available fly boxes on the market today. It holds dropper-rig assemblies or two flies, tied together with a single piece of monofilament fishing line as opposed to just individual flies and does so in a well organized, tangle free, secure environment. It can be used with a single hand, thus freeing up one hand for other necessary tasks. It is fully waterproof which protects the flies from damage. It is of similar dimensions to other, standard fly boxes so it fits inside most fly vest pockets. It allows a user to pre-tie any number of dropper-rig assemblies and use any combination of artificial flies with just about any length of monofilament line connecting them. Additionally, the invention is long lasting, easy to clean and relatively simple to manufacture.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIGS. 4a and 4b are perspective views of the guide, which extends the interior length of the outer case;

FIG. 5 is a perspective view of the outer case, showing the guide that extends from its back inside wall to its leading edge as well as the arrest device that resides at the leading edge of the guide itself;

FIG. 6 is a perspective view of the modular insert and its components, the insert base and the insert extension showing the recession of the insert extension and the cut away channel that allows for the guide to extend up the center of the device;

FIG. 7 is a perspective view of the pressure clip;

FIG. 8 is a perspective view of the insert extension sleeve that encloses the insert extension and holds the dropper-rig assemblies in place;

FIG. 9 is a perspective view of the insert cap and screws with extension tab.

DETAILED DESCRIPTION OF THE PREFERRED EMBODIMENT

Figure 2:
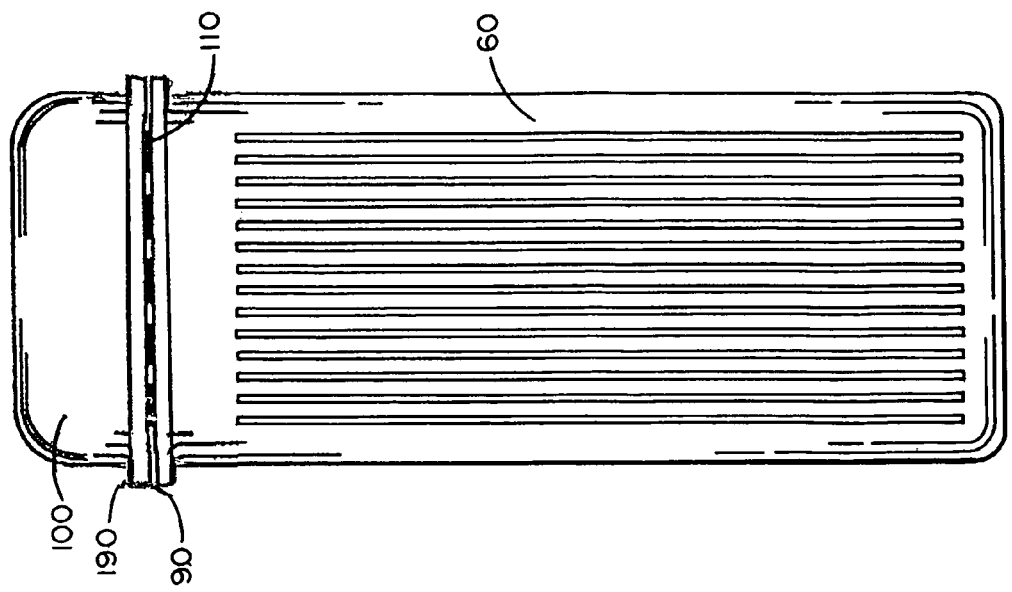
FIGS. 1 and 2 are front and back elevations of the invention, with the outer case cap locked down against the outer case.
Figure 1:
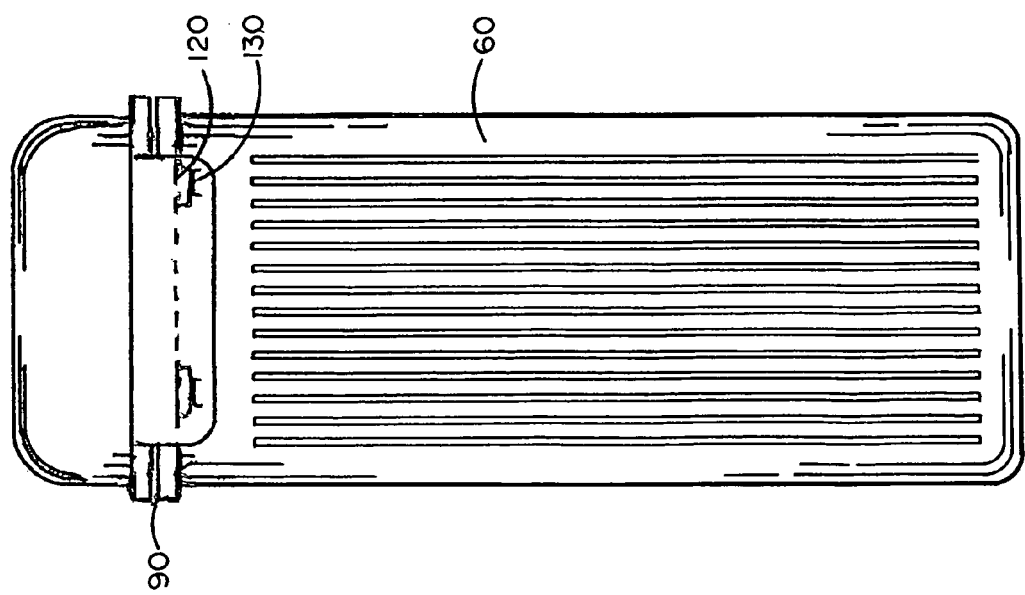

FIGS. 1 and 2 show a plan view of a dropper-rig fly assembly storage device embodying an outer case 60, an outer case cap 100, an outer case cap hinge 110, a locking tab 120, a locking tab bead 130 and an O-ring 90.

Outer case 60 is configured to create an internal space for storage with its leading edge being open and its other end being closed. In the preferred embodiment of the invention, case 60 is made from rigid, waterproof, injection molded plastic, of rectangular shape with its corners rounded.

Attached to or routed into the leading edge of outer case 60, with a base that is slightly below and an extension that is flush with the leading edge of outer case 60 is groove 170. Groove 170 is configured in such a way as to create an internal space for storage with its leading edge being open and its other end being closed; it encircles the leading edge of outer case 60 completely. Groove 170 extends outward and upward from the outer wall of outer case 60 until it is flush with the leading edge of outer case 60.

Hinge 110, extends outward from back side of outer case 60, originating from the outer edge of lip 190. In the preferred mode of the invention, hinge 110 is a continuous hinge that provides a movable spine which connects outer case 60 to outer case cap 100.

Locking tab 120 comprised of a piece of rigid material runs across a seam that exists between outer cap 100 and outer case 60. Protruding outward at 90 degrees, away from the leading edge of locking tab 120 is locking tab bead 130. Locking tab bead 130 is configured in such a way as to fit securely underneath the outer extensions found at the bottom of lip 190.

Figure 3B:
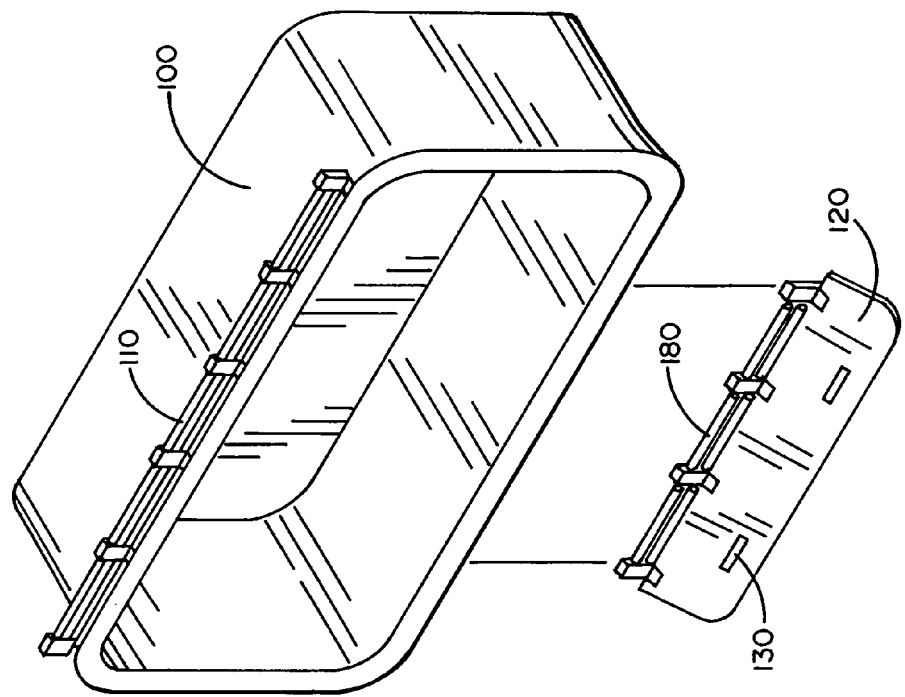
FIGS. 3a and 3b are top and perspective views, respectively, of the outer case cap.
Figure 3A:
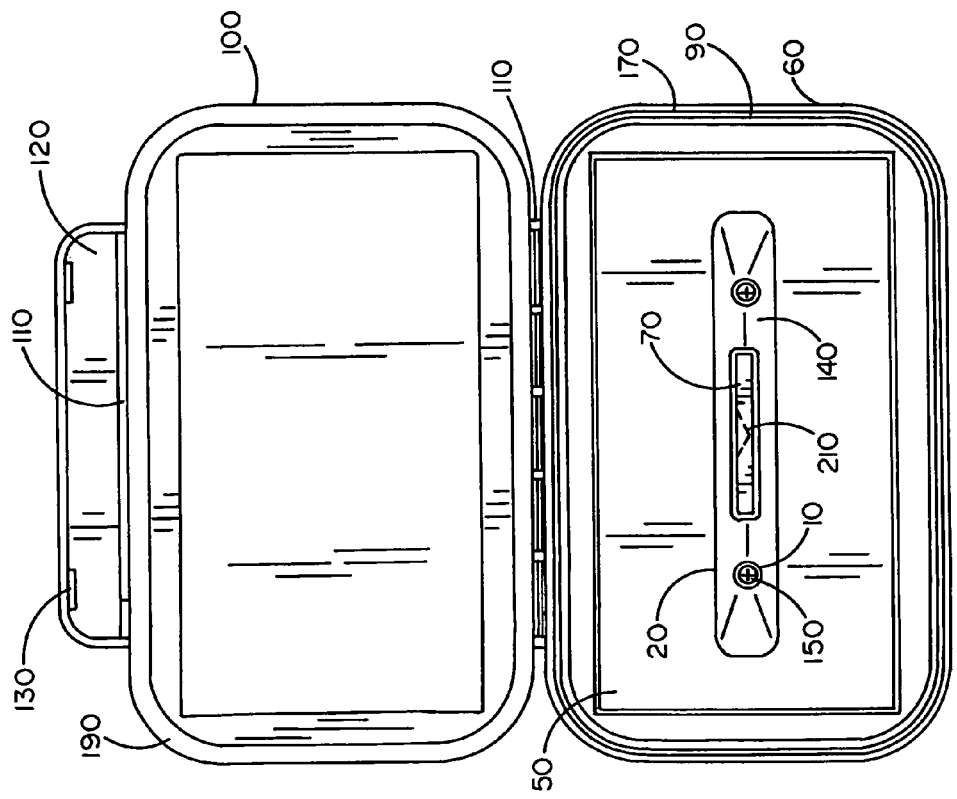

FIGS. 3A and 3B show outer case cap 100, comprising outer case cap hinge 110, outer case locking tab 120 and outer case cap locking hinge 180 configured to create an internal space for storage with its leading edge being open and its other end being closed. In the preferred embodiment of the invention cap 100 is comprised of rigid, waterproof, injection molded plastic, and with its corners rounded.

Lip 190 encircles the leading edge of cap 100 and is comprised of a piece of material, set at 90 degrees, extending outward away from the outer wall of cap 100. This extension terminates at point identical to the outer dimension of outer case groove 190 so that when cap 100 is closed against case 60, both of the two components are flush on all sides.

Outer case cap 100 has on one side, centered on its leading edge the second half of hinge 110 which connects cap 100 to outer case 60. Outer case cap 100 has, on its opposite side, centered on its leading edge hinge 180 which connects outer case cap 100 to locking tab 120.

FIG. 4, including FIGS. 4A and 4B, shows O-ring 90 comprised of flexible, compressible and waterproof material configured in such a way so that the lower half of O-ring 90 resides within groove 170 and upper half extends above the vertical extensions comprising groove 170, thus allowing O-ring 90 to protrude outward and become the leading edge of outer case 60.

FIG. 5. Shows a perspective view of outer case 60 and guide 70 that originates from the center of the inside wall of the base of outer case 60. Guide 70 is configured so that open space exists on all sides between the guide 70 and the internal walls of outer case 60.

The leading edge of guide 70 terminates at the leading edge of outer case 60 so that the two leading edges are flush. Guide 70 has running lengthwise along its center a groove 210.

Groove 210, comprising a routed or cut-away section that extends up the center of guide 70, terminates just short of its leading edge. Material at the leading edge of guide 70 creates an arrest 30. Arrest 30 provides an arresting obstacle at the leading edge of guide 70.

FIG. 6. shows insert 80, comprising an insert base 50, insert extension 20 and channel 200. Insert 80 is made of a structurally rigid material configured to be centered and flush at both the base and leading edge of outer case 60, when in the fully inserted position.

Insert 80, has at its base, insert base 50 comprising a non-abrasive, structurally rigid material with outer dimensions that are identical to the inner dimensions of outer case 60 and a channel 200 at its center, extending lengthwise from its base to its leading edge. Insert base 50 fits securely within outer case 60 and is allowed to slide, with limited friction and limited distortion backward and forward from the inside, back edge to the leading edge of outer case 60. When in the fully extended position, the leading edge of insert base 50 is flush with the leading edge of outer case 60.

Within the center of insert base 50 there exists channel 200 extending from its base to its leading edge for the purpose of allowing guide 70 to pass through the center of insert base 50 with limited friction.

Insert 80, has at its leading edge, insert extension 20 comprising a non-abrasive, rigid material which extends from the leading edge of insert base 50 and terminates at the leading edge of outer case 60. Extension 20 is of rectangular shape and is recessed from the inside walls of outer case 60 thus creating a gap, on all sides between insert extension 20 and the inner walls of outer case 60.

FIG. 7. shows pressure clip 40 comprising spring 220, center pivot 240 and arrest device 230 made of rigid material. Center pivot 240 comprising a rigid material, which in the preferred mode of the invention is made of stainless steel, allows pressure clip 40 to elevate on an axis, up and down when sufficient force is applied to one end.

Pressure clip 40 has, at one end, arrest device 230 comprising a rigid material which, in the preferred mode of the invention is of a "V" shape which protrudes into insert 80 until it comes into contact with guide groove 210 located on guide 70. Arrest device 230 is configured in such a way as to slide with limited friction within groove 210 and come into contact with guide arrest 30 when insert 80 is fully extended.

Pressure spring 220, applies sustained pressure on arrest device 230, keeping it securely positioned within guide groove 210. In the preferred mode pressure spring 220 may be rapped around center pivot 240.

FIG. 8 shows sleeve 160 that is made of a soft, resilient yet flexible material. It is open at its base with a 90-degree lip extending outward from its base encircling sleeve 160 and meeting flush with the leading edge of insert base 50. When the base edge of sleeve 160 is flush against the leading edge of insert base 50, the leading edge of sleeve 160 is flush with the leading edge of insert extension 20. Sleeve 160 is equal in length to insert extension 20 and covers it on all sides but leaves the leading edge of insert extension 20 slightly exposed.

The thickness of sleeve 160 may vary depending on the configuration but in the preferred mode of the invention the dimensions of sleeve 160 do not significantly reduce the amount of open space that exists between the outer dimensions of insert extension 20 and the inner walls of outer case 60.

FIG. 9 shows an insert extension cap 140 comprising, extension cap screws 150 and tab 250. Cap 140 is configured to extend beyond the leading edge of insert extension 20 and meet flush with the outer dimensions of sleeve 160 on all sides with tab 250 extending beyond the leading edge of outer case 60. In the preferred mode of the invention, insert cap 140 is made of injection molded plastic and is of a generally rectangular shape. Insert tab 250 comprising a flat rigid material, extends across the center of the leading edge of insert cap 140 leaving room on both sides for screws 150. Insert extension cap 140 and sleeve 160 are held in place via extension cap screws 150 which extend though extension cap 140 and into insert 80 at holes 10.

Figure 10:
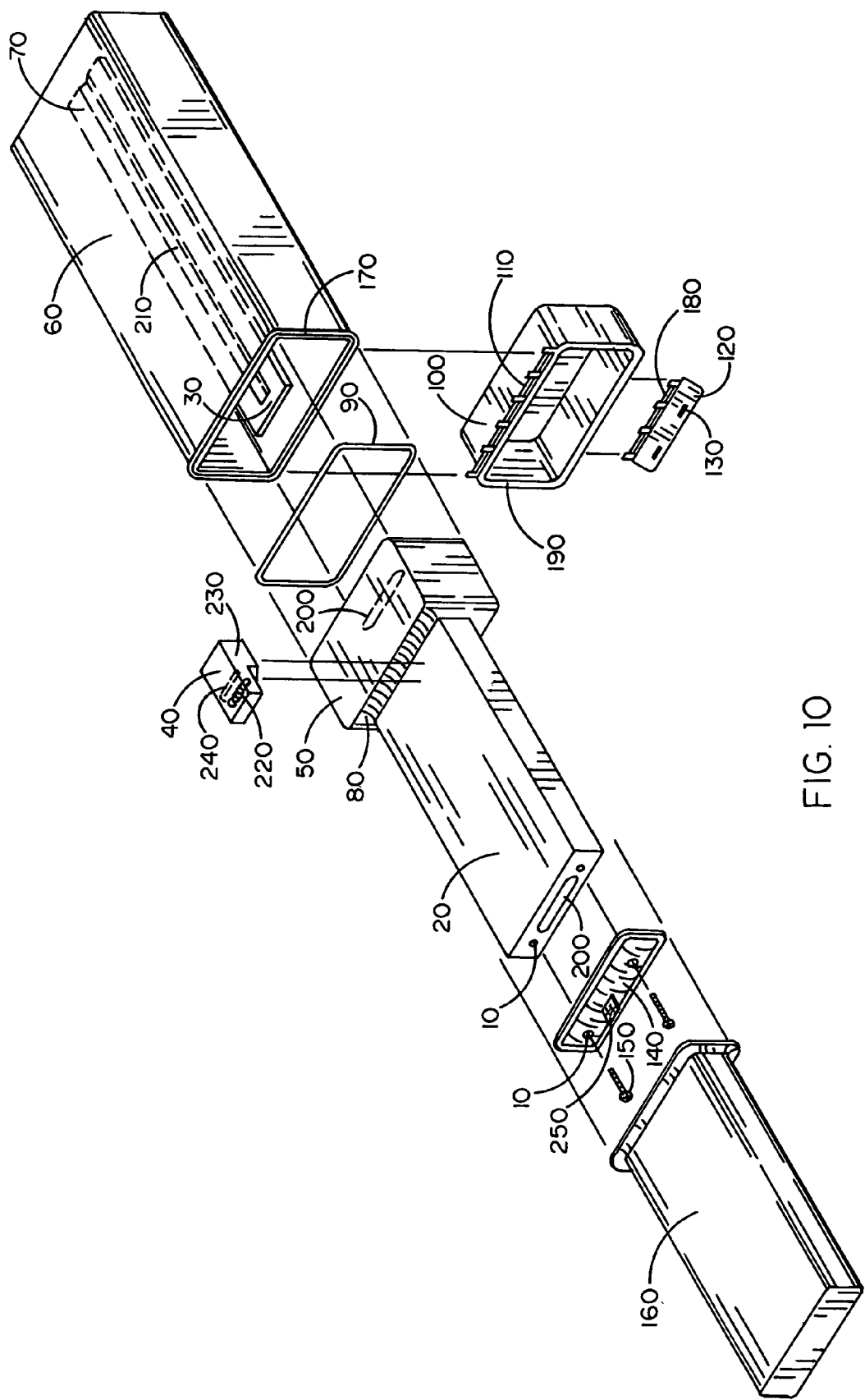
FIG. 10 is an exploded, perspective view of the preferred embodiment showing how the various components fit together.

FIG. 10 shows the location of pressure clip 40 in regard to insert 80, centered along the 90-degree angle that creates the recess of insert extension 20. Center pivot 240 extends beyond the outer dimensions of pressure clip 40 and into insert 80 thus creating the axis on which pressure clip 40 elevates. Sleeve 160 slides over and covers insert 80 and cap 140 holds sleeve 160 in place.

In operation a user would start with the device in the closed and locked position, initially releasing locking tab 120 and opening outer case cap 100, decompressing O-ring 90 and exposing the leading edge of insert extension 20 and insert tab 250. A user would then take hold of tab 250 and slide insert 80 outward away from the back surface of outer case 60. This movement also causes insert base 50 to slide with limited friction and structural rigidity within outer case 60. Arrest device 230, on pressure clip 40, which is located on one side of insert 80, will slide within groove 210 on guide 70.

With fully extended insert 80, insert extension 20 is fully exposed and insert base 50 is flush with the leading edge of outer case 60. At this point, arrest device 230 on pressure clip 40 comes into contact with guide arrest 30 on guide 70. This contact prevents insert 80 from further extraction and possible unintended disconnection from outer case 60.

In this position, insert extension 20 is fully extended exposing sleeve 160 which is held in place by insert cap 140. At this fully extended position, dropper-rig assemblies may be rapped around or removed from sleeve 160.

Dropper-rigs are added or removed and then insert 80 is pushed back into outer case 60 and outer case cap 100 is reapplied so that the remaining dropper-rig assemblies are protected within outer case 60.

In the event that a user would like to remove insert 80 completely from storage device 60, insert cap screws 150 are removed and sleeve 160 is pulled upward and over the leading edge of insert extension 20. Once sleeve 160 is fully removed, a user may access exposed pressure clip 40. A user then compresses the exposed end of pressure clip 40 elevating arrest device 230 and allowing it to pass over guide arrest 30 located at the end of groove 190. As arrest device 230 passes over guide arrest 30, insert base 50 extends beyond the leading edge of outer case 50 thus allowing its removal from outer case 60.

To create a waterproof seal, the leading edge of outer case cap 100 must meet and seal against the leading edge of outer case 60. This is accomplished by placing lip 190 into contact with the portion of O-ring 90 that protrudes, above the leading edge of outer case 60. When outer case cap 100 is closed against outer case 60, lip 190 comes into contact with and compresses O-ring 90 between itself and groove 170. This seal is fully effective when locking tab 120 is applied to outer case 60.

It is to be understood that while a preferred embodiment is illustrated and described herein, the invention is not to be limited to these specific forms or arrangement of parts herein described, but only by the appended claims and their equivalents:

I claim:

1. A container apparatus for storing artificial flies and the monofilament line that connects them, the apparatus comprising:

a generally rectangular storage device having an inner space, walls, and an elongated guide with a groove and extending from a back inside wall of said storage device and through said inner space;

a cap with hinge configured to enclose said storage device with a watertight seal;

an insert with base and extension, the outer dimensions of said base being equal to the inner dimensions of said storage device allowing for a friction fit between the two elements to allow said insert to extend and retract along said guide within said storage device, with the extension being spaced from said storage device walls and extending along the center of said storage device to create a space for storage of said flies between outer planar surfaces of said extension and inner planar surfaces of the walls of said storage device, the outer planar surfaces of said extension having dimensions exceeding the length of said artificial flies to permit said flies to lay flat on said extension; an arrest device having a spring and a pressure clip, said arrest device integral to said elongated guide for preventing inadvertent removal of said insert from said storage device; and a sleeve covering said insert extension and meeting flush with a leading edge of said insert base.

2. The container apparatus recited in claim 1 wherein said insert extension is surrounded by a soft exterior surface for receiving said artificial flies.

3. A dropper-rig fly assembly storage box comprising:
a container having an openable end enclosed by a cap for gaining selective access to the interior of said container;
an elongated guide extending from said openable end to an opposed closed end surface of said container,
a slideable insert with base and extension mounted upon said guide for movement toward and away from said closed end; at least a portion of said insert having a rectangular surface for receiving dropper-rig flies, said surface being spaced from all interior planar wall surfaces of said container to safeguard said flies against damage, said insert having planar surfaces the dimensions of which exceed the size of said assembly to permit each said dropper fly rig to lay flat on said rectangular surface; an arrest device having a spring and a pressure clip, said arrest device integral to said elongated guide for preventing inadvertent removal of said insert from said storage device; and a sleeve covering said insert extension and meeting flush with a leading edge of said insert base.

4. The storage box recited in claim 3 wherein said container and said cap provide a watertight interior.

5. The storage box recited in claim 3 wherein said elongated guide has a groove along substantially its entire length and said insert having a base that rides on said guide for partial retraction from said container interior for placement and removal of flies on said rectangular insert surface.

\* \* \* \* \*